US00RE36223E

United States Patent [19]

Schuler

[11] E Patent Number: Re. 36,223

[45] Reissued Date of Patent: Jun. 8, 1999

[54] FIRST STAGE SCUBA REGULATOR

[76] Inventor: Manfred Schuler, 17462 Wayne Ave., Irvine, Calif. 92714

[21] Appl. No.: 08/781,648

[22] Filed: Jan. 10, 1997

Related U.S. Patent Documents

Reissue of:

[64] Patent No.: 5,379,761
Issued: Jan. 10, 1995
Appl. No.: 08/096,011
Filed: Jul. 21, 1993

[51] Int. Cl.[6] ..... A62B 9/02

[52] U.S. Cl. ..... 128/205.24

[58] Field of Search ..... 128/200.24, 204.26, 128/204.18, 205.24; 137/494, 908, 334, 505.25, 882, 883

[56] References Cited

U.S. PATENT DOCUMENTS

| | | | |
|---|---|---|---|
| 3,744,526 | 1/1973 | MacNiel | 137/599.2 |
| 4,266,538 | 5/1981 | Ruchti | 128/204.26 |
| 4,285,339 | 8/1981 | McIntyre | 128/204.23 |
| 4,655,246 | 4/1987 | Phlipot | 137/505.11 |
| 4,802,504 | 2/1989 | Politi | 137/454.5 |
| 4,823,835 | 4/1989 | Chu | 137/557 |
| 4,838,256 | 6/1989 | Miltz | 128/202.27 |
| 4,840,199 | 6/1989 | Brunt, Jr. | 137/883 |
| 5,056,563 | 10/1991 | Glossop | 137/883 |
| 5,097,860 | 3/1992 | Ferguson et al. | 137/78.1 |
| 5,176,169 | 1/1993 | Ferguson | 137/454.5 |
| 5,190,030 | 3/1993 | Semeia | 128/204.26 |

FOREIGN PATENT DOCUMENTS

| | | | |
|---|---|---|---|
| 1550353 | 9/1996 | Germany | 137/883 |

*Primary Examiner*—Mickey Yu
*Assistant Examiner*—Dinh X. Nguyen
*Attorney, Agent, or Firm*—Walter A. Hackler

[57] ABSTRACT

A first stage pressure regulator for use with a high pressure source of breathable gas includes a housing and either a yoke arrangement for connection to the conventional U.S. high pressure gas source or a DIN connection for coupling to a European-type gas source. First and second pressure-regulated outlets are provided and independently regulated in order to provide from a single high pressure source dual intermediate pressure air for delivery to second stage regulators. In combination with second stage regulators, a system is provided which has enhanced safety features.

34 Claims, 4 Drawing Sheets

FIG. 1.
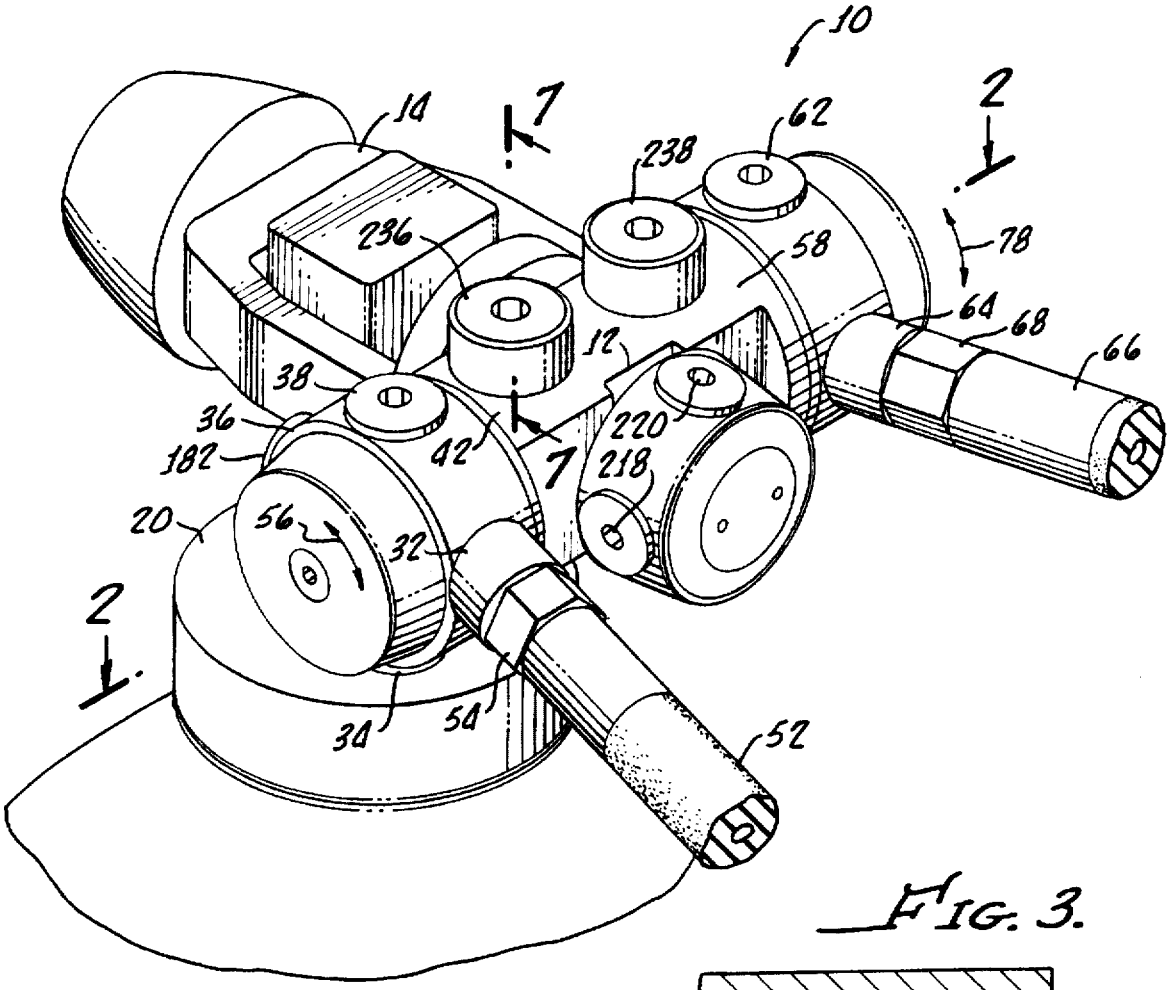
FIG. 3.
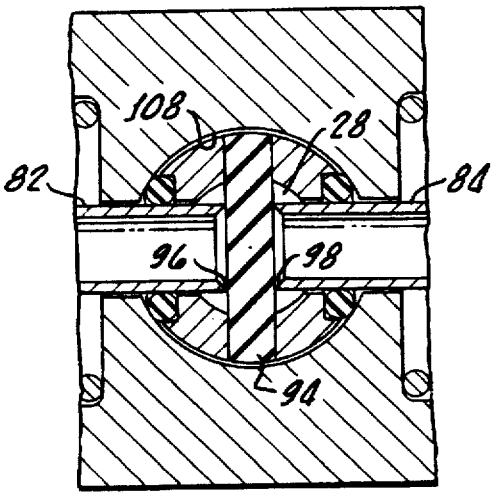
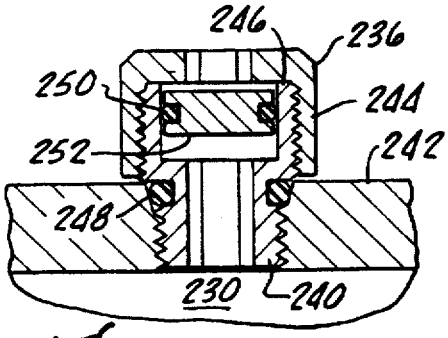
FIG. 7.

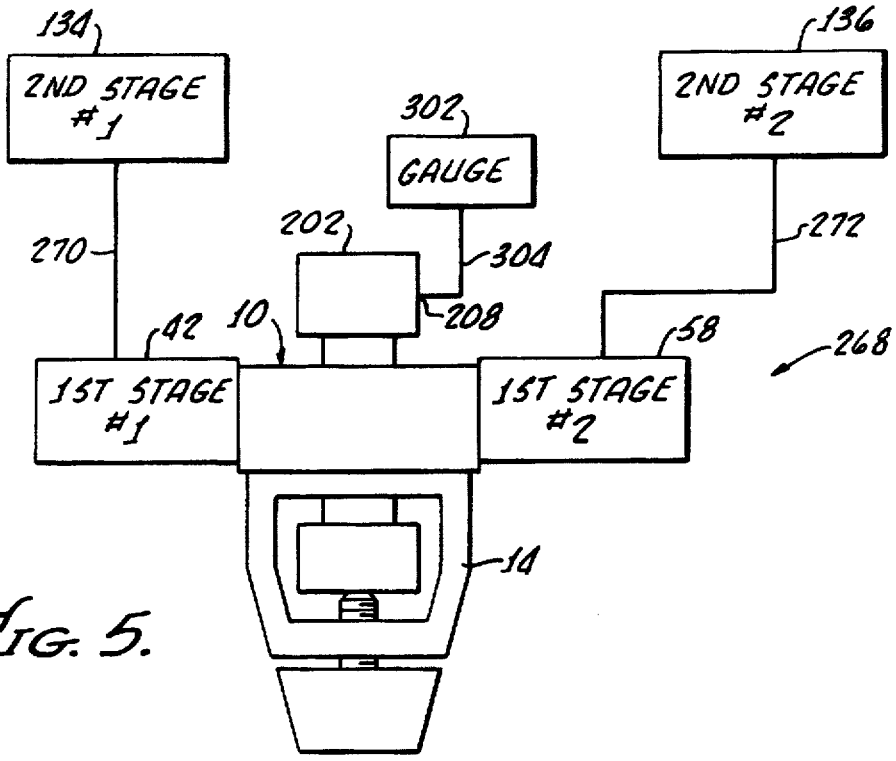
FIG. 5.
FIG. 6.
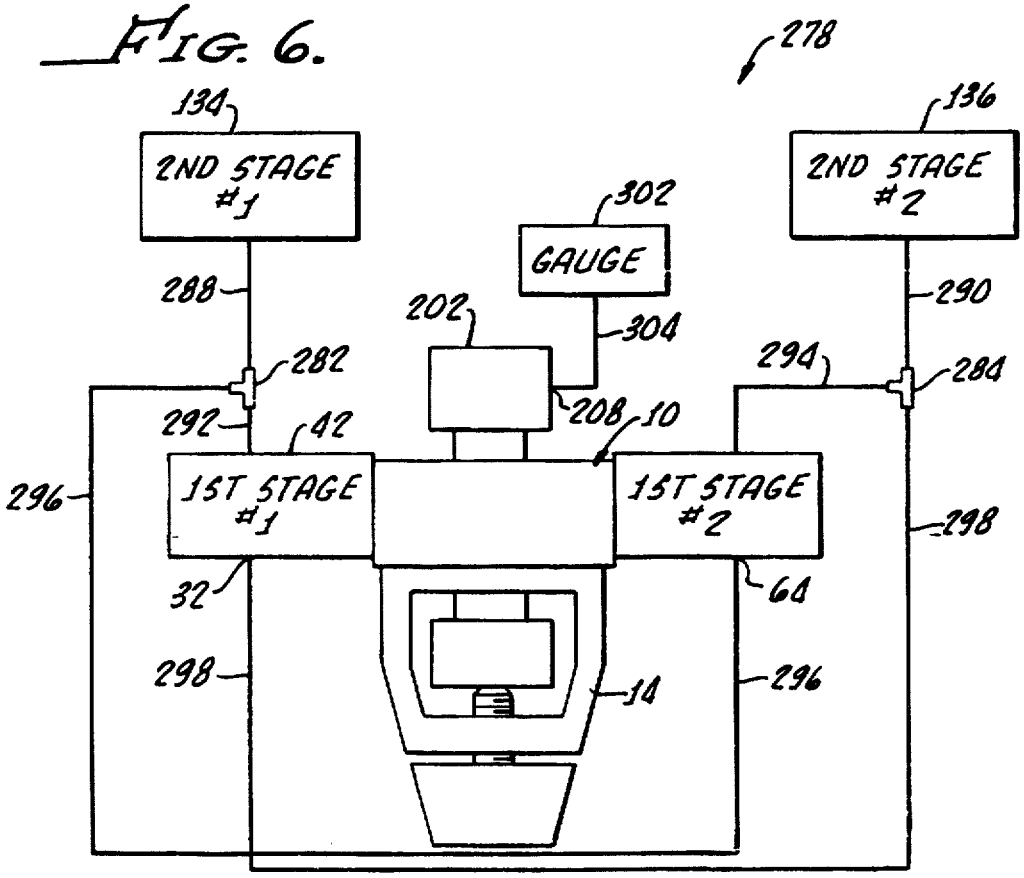

FIRST STAGE SCUBA REGULATOR

Matter enclosed in heavy brackets [ ] appears in the original patent but forms no part of this reissue specification; matter printed in italics indicates the additions made by reissue.

The present invention is addressed to self-contained breathing systems, such as those used in SCUBA diving equipment, and more particularly relates to a first stage pressure regulator and a SCUBA regulator system having enhanced safety features.

Typically, SCUBA divers utilize a high pressure source of breathable gas at a relatively high pressure which may exceed 3,000 psi.

The breathable gas or air, is typically reduced in pressure by a first stage regulator at a constant intermediate pressure of about 140 psi. The firs stage regulator is mounted directly on the high pressure source of air and the intermediate pressure air is applied to a second stage regulator which provides air to the diver at a useable pressure.

For safety purposes, the first stage regulator commonly may have two intermediate pressure air outlets which are in turn coupled to two separate second stage regulators and associated mouthpiece. The two outlets are both dependant on a single regulator valve system for a common supply of intermediate pressure air. Second stage SCUBA regulators for use in combination with the first stage regulator, in accordance with the present invention, are generally well known and described, for example, in U.S. Pat. No. 5,259,375 entitled Second Stage SCUBA Regulator with Balanced Piston Volume Control. This U.S. patent is incorporated herewith by specific reference thereto for the purpose of describing suitable second stage regulators which may be used in unique combination with the first stage regulator of the present invention in order to achieve a novel SCUBA regulator system.

As is pointed out in U.S. Pat. No. 5,097,860, a disadvantage of present day regulators arises from the fact that they are susceptible to icing and corrosion from the impurities contained in ambient water, and that decreases the useful life of the regulators and increases the maintenance cost thereof. Further, since only one first stage regulator is commonly used in a SCUBA regulator system, such icing may prevent proper regulation of the high pressure air which may cause serious problems to the diver.

As hereinabove pointed out, often more than one second stage regulator is utilized; however, both of the second stage regulators heretofore have been connected to the single valve first stage regulator and hence the redundancy of second stage regulators is of no avail should the first stage regulator malfunction.

U.S. Pat. No. 5,097,860 utilizes a diaphragm in order to prevent internal mechanisms of the regulator from being exposed to ambient water. However, despite these precautions, should the first stage regulator become inoperative and the supply of air provided to the second stage regulator is jeopardized, serious injury or distress may be encountered by the SCUBA diver.

The first stage regulator in the system provided by the present invention provides a degree of safety heretofore never provided by a single first stage regulator. An independent dual output is provided by the first stage regulator in accordance with the present invention so that if one side or portion of the fit stage regulator becomes inoperative, the other side is fully operative in providing a reliable new source of intermediate pressure air to one or more second stage regulators.

SUMMARY OF THE INVENTION

In accordance with the present invention, a first stage pressure regulator for use with a high pressure source of breathable gas generally includes a housing and means for attaching the housing to the high pressure source of breathable gas.

A first pressure-regulated outlet is provided along with a second pressure-regulated outlet.

Importantly, first means disposed within the housing is provided for delivering to the first pressure regulator outlet a supply of breathable gas at a pressure lower than the high pressure source and second means, disposed within the housing and operationally independent from the first means, is provided for delivering to the second pressure-regulated outlet a supply of breathable gas at a pressure lower than the high pressure source.

Because the first and second means for delivering regulated air to the outlets are operationally independent from one another, the single stage pressure regulator, in accordance with the present invention provides a safety level unobtainable from heretofore developed first stage regulators. If the first means, or the second means, becomes inoperative for any reason, regulated breathable gas is still provided by the first stage pressure regulator in accordance with the present invention.

More particularly, the fist stage pressure regulator, in accordance with the present invention, may comprise a single valve seat member fixed within the housing and fist means may comprise a first piston having a hollow center in fluid communication with the first pressure-regulated outlet and open end means for sealing the first piston against one side of the fixed valve seat member.

In addition the second means may comprise a second piston having a hollow center in fluid communication with the second pressure regulated outlet and open end means for sealing the second piston against another side of the fixed valve seat member.

First spring means may be provided for biasing the first piston in order to effect a first regulated valve opening between the first piston open end means and the fixed valve seat member, and second spring means may be provided for biasing a second piston in order to effect a second regulated valve opening between the second piston open end means and the fixed valve seat member.

It is important to appreciate that the valve seat member is fixed within the housing and, unlike prior art devices, no movement is necessary in order to regulate the pressure of the breathable air delivered to the first and second outlets.

Regulation of the intermediate air pressure to both the first and second pressure-regulated outlets is provided by first and second secondary spring means for adjusting the amount of bias provided by the first and second spring means, respectively.

In addition, first and second body means, each rotatably mounted to the housing, may be provided for supporting first and second pressure-regulated outlets, respectively and screw means may be provided which is accessible from outside of the first and second body means, respectively, for changing the compression of the first and second secondary spring means.

A plurality of first pressure-regulated outlets may be disposed in the first body means and a plurality of second pressure-regulated outlets may be disposed in the second body means to enable the use of more than two second stage regulators with the first stage regulator, in accordance with the present invention.

In addition, at least one high pressure outlet may be provided and attached to the housing in direct fluid communication with the high pressure source of breathable air in order to prevent the volume of air in the high pressure source and may be monitored.

A SCUBA regulator system, in accordance with the present invention, for use with a single high pressure source of breathable gas generally includes a single stage pressure regulator having first and second independently operating pressure-regulated outlets, as hereinabove set forth, and adapted for being connected to the single high pressure source of breathable gas.

Means are provided for independently delivering to first and second pressure-regulated outlets a supply of breathable gas at an intermediate pressure lower than the pressure of the single high pressure source of breathable.

Two second stage regulator means are provided for receiving the intermediate pressure breathable air from the first and second pressure-regulated outlets and delivering breathable to at least one mouthpiece at a pressure suitable for a SCUBA diver.

In one embodiment of the present invention, means are provided for connecting one of the two second stage pressure regulator means to the first pressure-regulated outlet and another of the two second stage pressure-regulated outlets to the second pressure-regulated outlet.

Alternatively, means may be provided for connecting both of the two second stage pressure regulator means to both the first and second pressure-regulated outlets. In this manner, if one of the first and second pressure-regulated outlets from the first stage regulator falls to deliver the intermediate pressure, both of the second stage pressure regulator means remain operative.

BRIEF DESCRIPTION OF THE DRAWINGS

The advantages and features of the present invention will be better understood by the following detailed description when considered in conjunction with the accompanying drawings in which.

FIG. 1 is a perspective view of the first stage pressure regulator in accordance with the present invention generally showing the regulator attached to the high pressure source and having first and second pressure-regulated outlets;

FIG. 3 is a cross-sectional view of a valve seat member shown in FIG. 2 taken along the line 3—3;

FIG. 5 is a schematic drawing of the SCUBA regulator system in accordance with the present invention showing first and second stage regulators connected respectively to first and second outlets of the first stage regulator in accordance with the present invention;

FIG. 6 is a schematic drawing similar to FIG. 5 showing the first and second stage regulators being coupled to both the first and second outlets of the first stage regulator in accordance with the present invention; and FIG. 7 is a cross-sectional view of a pressure equalizing assembly disposed in a housing of the first stage pressure regulator.

DETAILED DESCRIPTION

Figure 2:
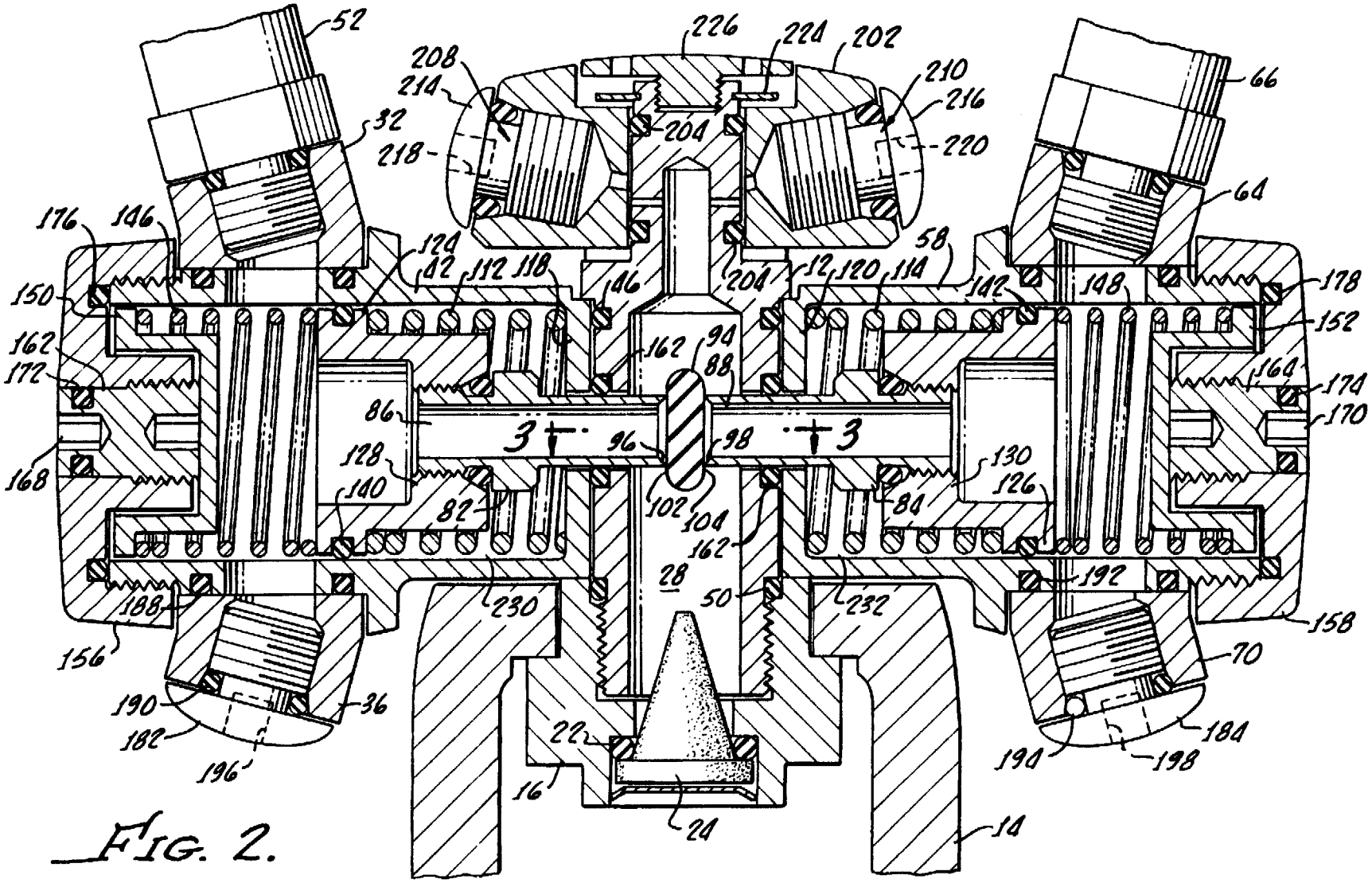
FIG. 2 is a cross-sectional view of the first stage regulator shown in FIG. 1 taken along the line 2–2'

Turning now to FIG. 1, there is generally shown a first stage pressure regulator 10, in accordance with the present invention, having a housing 12 with a yoke 14 and nut 16 threaded thereto which provides a means for attaching the housing 12 to a high pressure source 20, as shown in FIG. 2, and O-ring 22 provides a seal and a filter 24 prevents contamination from passing between the high pressure breathable gas source 20 and a central chamber 28 of the housing 12. The yoke 14 configuration shown in FIGS. 1 and 2 is conventional for U.S. configured supply tank 20.

A plurality of first pressure-regulated outlets 32, 34, 36, 38 may be rotatably disposed in a first body 42 which is mounted to the housing 12 and sealed thereto by O-rings 46, 50.

The multiple outlets 32, 34, 36, 38 enable a plurality of second stage regulators (not shown) to be supplied with breathable air of intermediate pressure. As shown in FIG. 1, only one line 52 is interconnected to outlet 32 by a conventional coupling 54. Rotation of the body 42 in opposite directions as indicated by the arrow 56 enables the line 52 to be conveniently positioned with respect to the diver.

A second body 58 is provided with outlets 62, 64 with a second line 66 being attached to the outlet 64 by a conventional coupling 68. While only two outlets 62, 64 are shown in the figures, it should be appreciated that the second body 58 may include four outlets symmetrically disposed around the body 58 as is the case with the first body 42. Similar to the first body 42, the second body 58 is rotatably attached to the housing 12 and sealed thereto by the O-rings 46, 50 for enabling rotation of the body as indicated by the arrow 78.

Turning now to FIG. 2, first and second pistons 82, 84 having hollow centers 86, 88 and a single valve seat 94 provide first and second means disposed within the housing 12 for delivering to the fist pressure-regulated outlets 32, 34, 36, 38 and second pressure-regulated outlets 62, 64, respectively, a supply of breathable gas at a pressure lower than the high pressure source.

More specifically, the pistons 86, 88 include open ends 96, 98 for sealing the first and second pistons 82, 84 respectively against opposite sides 102, 104 of the seat 94.

As shown in FIG. 3, the seat 94 is affixed to the inside sidewall 108 of the chamber 28 and is preferably fabricated from a solid plastic material or the like having sufficient stiffness to prevent movement when engaged by the piston open ends 96, 98, but yet enables seating, or sealing, of the pistons 82, 84 thereagainst.

Turning again to FIG. 2, the first and second springs 112, 114 compressed between end walls 118, 120 of the first and second bodies 42, 58 respectively, and shoulders 124, 126 of bushings 128, 130 threadably engaging the pistons 82, 84, respectively, provide a means for biasing the first and second pistons 82, 84 in order to effect regulated valve openings between the first pistons and open end 96 and the one side 102 of the seat 94 and between the open end 98 and another side 104 of the seat 94.

In operation, the springs 112, 114 balance the pistons 82, 84 such that when air is drawn through one of the outlets 32, 34, 36, 38, or 62, 64, the springs 112, 114 respectively urge the pistons 82, 84 away from the seat member 94 to enable high pressure air in the chamber 28 from the high pressure source 20 to enter the hollow center portions 86, 88 to be delivered and removed through the outlets 32, 34, 36, 38 and 62, 64. When the removed air is replenished, the piston returns to a sealed engagement with the seat member 94.

It should be obvious that each of the pistons 82, 84 operate independently from one another and therefore a malfunction of one piston, for example piston 82, will not affect the performance of the second piston 84. This provides an inherent safety system which can be utilized with second stage regulators as will be discussed thereinafter in greater detail.

The bushings 128, 130 are slidably disposed within the bodies 42, 58 respectively with O-rings 140, 142 providing a seal therebetween.

In order to provide a means for adjusting the amount of bias provided by the first and second springs 112, 114 in order to regulate the pressure of the supply of breathable gas available from a first outlet 32 and a second outlet 64, secondary springs 146, 148 are disposed respectively within the first and second bodies 42, 58 between the bushings 128, 130 and retainers 150, 152 respectively. Caps 156, 158 are respectively threaded to the bodies 42, 58 in order to seal the bodies 42, 58 and to capture the springs 112, 114, 146, 148 along with the bushings 128, 130 and retainers 150, 152, all respectively within the bodies 42, 58. Threaded plugs 162, 164 provide a screw mean accessible from outside the first and second bodies 42, 58 for changing the compression of the first and second secondary springs 146, 148. Each plug 162, 164 includes a hex-shaped depression 168, 170 to facilitate rotation thereof for changing the spring 146, 148 compression, as hereinabove noted.

O-rings 172, 374 provide a seal between the plugs 162, 164 and the caps 156, 158, respectively. O-rings 176, 178 provide a means for sealing the caps 156, 158 to the bodies 42, 58 upon screwing up the caps 156, 158 to the bodies 42, 58 respectively. Outlets 32, 36 and 64, 70 are either coupled to lines 52, 66 or are sealed by caps 182, 184. O-rings 188, 190, 192 and 194, respectively provide the seals for the outlets 32, 36, 64, 70 and caps 82, 94, respectively. Hex-shaped cavities 196, 198 are provided for enabling removal and insertion of the caps 182, 184 respectively.

Turning again to FIGS. 1 and 2, a swivel cap 202 is rotatably mounted to the housing 12 and sealed thereto by O-ring 204. The swivel cap carries a plurality of high pressure outlets 208, 210, which communicate with the high pressure chamber 28 of the housing 12. Removal of plugs 214, 216 threadably engaging swivel cap 202 by means of hex openings 218, 220 enables the attachment of the high pressure gauge as indicated in FIGS. 5 and 6. Access to the retainer 224 is provided by a plug cover 226.

In order to reduce the possibility of icing or corrosion of the springs 112, 114 and pistons 82, 84, body volumes 230, 232 may be filed with al antifreeze type fluid, such as alcohol.

Accordingly, in order to equalize the pressure within the body volumes 230, 232, with ambient water pressure, pressure equalizers 236, 238 are provided as shown in FIGS. 1 and 7. As detailed in FIG. 7, the pressure equalize 236 includes a body portion 240 screwed into a housing wall 242 with a cap 244 threadably engaging an upper portion 246 of the body 240 with an O-ring 248 providing a seal between the housing wall 242 and body 240 and an O-ring 250 providing an inner seal. A piston 252 disposed within the body 240 enables the balance of ambient water pressure with the body volume 230.

Figure 4:
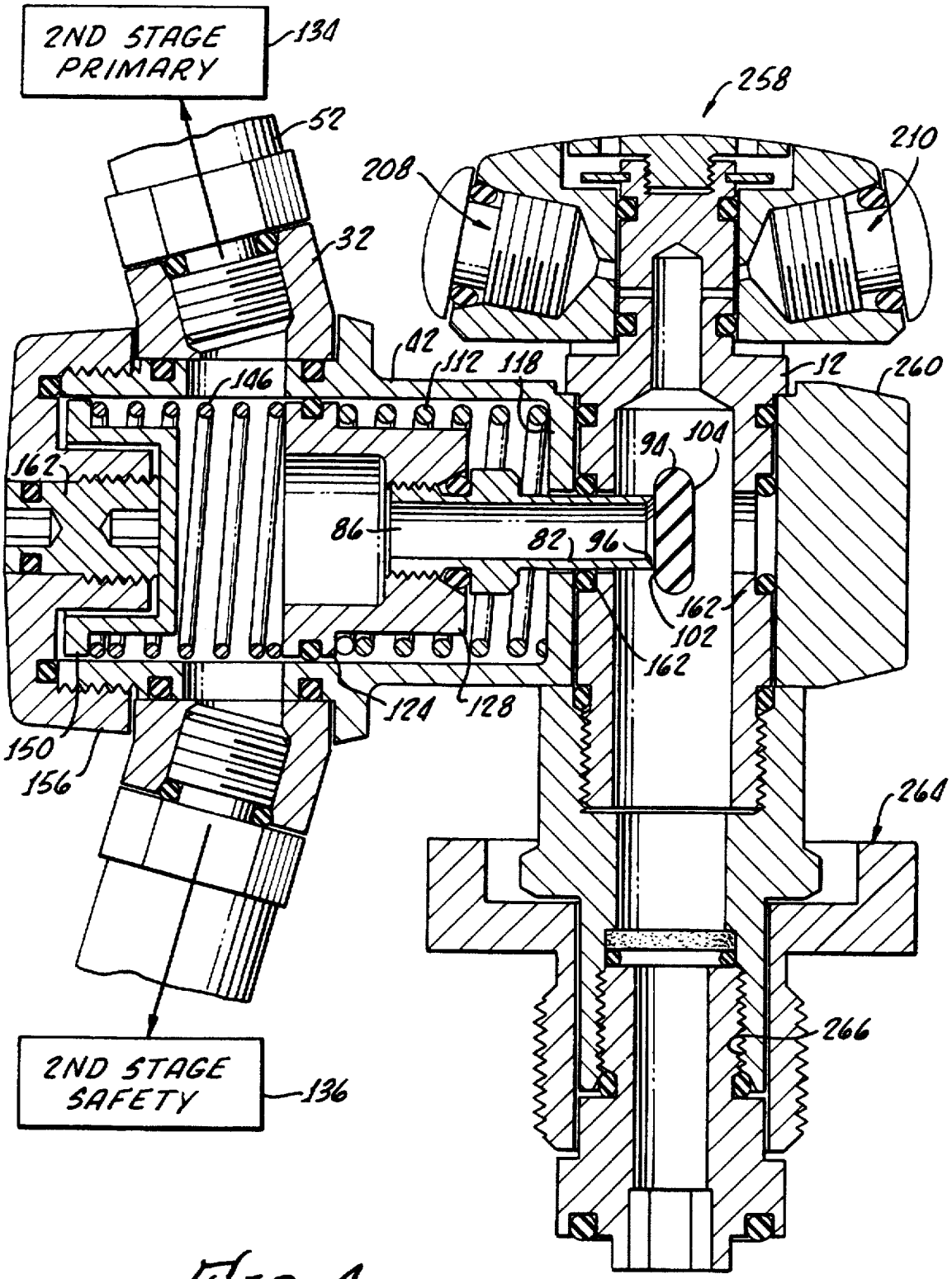
FIG. 4 is an alternative embodiment of the present invention showing a single-sided first stage regulator converible to a dual-sided first stage regulator.

Shown in FIG. 4 is an alternative embodiment 258 of the present invention utilizing a single body 42. Like numbers on FIG. 4 correspond to the already-described mechanism shown in the left side of FIG. 2. It should be appreciated that the embodiment 158 may be converted at a later time to the embodiment 10 by the removal of a cover 260 and insertion of a second body 58 (not shown in FIG. 4), a seal between the cover 260 or the second body 58 being provided by O-ring 262. This feature enables the embodiment 258 to be "upgraded" at a later time at the convenience of the user. Also shown in FIG. 4 is a DIN European-type coupling 264. Accordingly, the housing 12 is appropriately fitted with threads 266 for engagement therewith.

Turning now to FIG. 5, there is shown a SCUBA regulator system which generally includes the first stage regulator 10, as hereinabove described interconnected through lines 270, 272 to second stage regulators 134, 136, thereinabove referred to. The two second stage pressure regulators 134, 136 receive intermediate pressure breathable air at about 125 to 150 psi and deliver breathable air to at least one mouthpiece at a pressure suitable for a SCUBA diver in a conventional manner.

Importantly, as hereinabove described, the regulator 10 provides two separate and independent sources of such intermediate pressure breathable air from a single high pressure source 20, and hence any malfunction of one of the pistons 82, 84 will not result in a failure of the system in supplying intermediate breathable air to the second stage regulator.

Prior art systems have utilized dual second stage regulators; however, they are both connected to a single first stage regulator and hence failure of the latter results in total failure of the system. An alternative embodiment 278 of a SCUBA regulator system, in accordance with the present invention, includes the first stage regulator 10 as hereinabove described, along with second stage regulators 134, 136, as hereinabove noted.

Importantly, T-connectors 282, 284 provide a mews for connecting both of the two second stage pressure regulators 134, 136 to both the first and second pressure-regulated outlets 32, 64 via lines 288, 290, 292, 294, 296, 298.

This interconnection enables either of the second stage regulators 134, 136 to operate from either of the first stage independent outlets 32, 64. Thus, failure of one of the pistons 82, 84 will enable either of the second stage regulators 134, 136 to remain operative. This may be important should one of the second stages 334, 136 malfunction. It also provides additional safety for buddy diving operations. Also shown in FIGS. 5 and 6 is a representation of a high pressure gauge 302 interconnected by a line 304 to the high pressure outlet 208 on the first sage regulator 10.

Although there has been hereinabove described a first stage regulator and SCUBA regulator system in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A first stage pressure regulator for use with a high pressure source of breathable gas, said first stage pressure regulator comprising:

a housing means for attaching said housing to a high pressure source of breathable gas;

a first pressure regulated outlet;

a second pressure regulated outlet;

first mean disposed within said housing for delivery to said first pressure regulated outlet a supply of breathable gas at a pressure lower than the high pressure source;

second means, disposed within said housing and operationally independent from said first means, for delivering to said second pressure regulated outlet a supply of breathable gas at a pressure lower than the high pressure source; and first spring means for biasing said first piston in order to effect a first regulated valve opening between the first piston open end means and the fixed valve seat member and second spring means for biasing said second piston in order to effect a second regulated valve opening between the second piston open end means and the fixed valve seat member.

2. The first stage pressure regulator according to claim 1 further comprising a single valve seat member fixed within said housing, said first means comprising a first piston having a hollow center in fluid communication with said first pressure regulated outlet and open end means for sealing said first piston against one side of the fixed valve seat member and said second means comprising a second piston having a hollow center in fluid communication with said second pressure regulator outlet and open end means for sealing said second piston against another side of the fixed valve seat member.

3. The first stage pressure regulator according to claim 2 further comprising first secondary spring means for adjusting the amount of bias provided by the first spring means in order to regulate a pressure of the supply of breathable gas available from said first pressure regulated outlet and second secondary spring means for adjusting the amount of bias provided by the second spring means in order to regulate the pressure of a supply of breathable gas available from said second pressure regulating outlet.

4. The first stage pressure regulator according to claim 1 further comprising first body menu rotatably mounted to said housing, for supporting said first pressure regulated outlet and second body means rotatably mounted to said housing, for supporting said second pressure regulating outlet.

5. The first stage pressure regulator according to claim 4 wherein the first and second secondary spring means each comprise a screw means accessible from outside of said first and second body means respectively, for changing compression of the first and second secondary spring means.

6. The first stage pressure regulator according to claim 5 further comprising a plurality of first pressure regulated outlets disposed in said first body means and a plurality of second pressure regulated outlets disposed in said second body means.

7. The first stage pressure regulator according to claim 6 further comprising at least one high pressure outlet attached to said housing and in direct fluid communication with the high pressure source of breathable gas.

8. The first stage pressure regulator according to claim 7 further comprising a plurality of high pressure outlets rotatably attached to said housing and in direct fluid communication with the high pressure source of breathable gas.

9. A first stage pressure regulator for use with a high pressure source of breathable gas, said first stage pressure regulator comprising:

a housing;

means for attaching said housing to a high pressure source of breathable gas;

first body means attached to said housing for providing plurality of first pressure regulated outlets;

second body means attached to said housing for providing a plurality of second pressure regulated outlets;

first means for delivering to said plurality of first pressure regulated outlets a supply of breathable gas at a pressure lower than the high pressure source;

second means, operationally independent from said first means for delivery to said plurality of second pressure regulated outlets a supply of breathable gas at a pressure lower than the high pressure source; and first spring mean for biasing said first piston in order to effect a first regulated valve opening between the first piston open end means and the fixed valve seat member and second spring means for biasing said second piston in order to effect a second regulated valve opening between the second piston open end means and the fixed valve seat member.

10. The first stage pressure regulator according to claim 9 wherein said first body means and said second body means are rotatably attached to said housing.

11. The first stage pressure regulator according to claim 10 further comprising a single valve seat member fixed within said housing, said first means comprising a first piston having a hollow center in fluid communication with said first pressure regulated outlet and open end means for sealing said first piston against one side of the fixed valve seat member and said second means comprising a second piston having a hollow center in fluid communication with said second pressure regulator outlet and open end means for sealing said second piston against another side of the fixed valve seat member.

12. The first stage pressure regulator according to claim 11 further comprising first secondary spring means for adjusting the amount of bias provided by the first spring means in order to regulate a pressure of the supply of breathable gas available from said first pressure regulated outlet and second secondary spring means for adjusting the amount of bias provided by the second spring means in order to regulate the pressure of a supply of breathable gas available from said second pressure regulating outlet.

13. The first stage pressure regulator according to claim 12 wherein the first and second secondary spring means each comprise a screw means accessible from outside of said first and second body means respectively, for changing compression of the first and second secondary spring means.

14. The first stage pressure regulator according to claim 13 further comprising at least one high pressure outlet attached to said housing and in direct fluid communication with the high pressure source of breathable gas.

15. The first stage pressure regulator according to claim 14 further comprising a plurality of high pressure outlets rotatably attached to said housing and in direct fluid communication with the high pressure source of breathable gas.

16. A first stage pressure regulator for use with a high pressure source of breathable gas, said first stage pressure regulator comprising:

a housing;

means for attaching said housing to a high pressure source of breathable gas;

outlet means for delivering a supply of breathable air, at a pressure lower than said high pressure source, to a second stage regulator;

a valve seat member fixed within said housing;

a piston having a hollow center in fluid communication with said outlet means and open end means for seating said piston against the fixed valve seat member;

spring means for biasing said piston in order to effect a regulated valve opening between said open end means and the fixed valve seat; and secondary spring means for adjusting the amount of bias provided by said spring means in order to regulate the pressure of the supply of breathable gas at a pressure lower than said high pressure source.

17. The first stage pressure regulator according to claim 16 further comprising body means rotatably mounted to said housing, for supporting said outlet means.

18. The first stage pressure regulator according to claim 17 wherein the secondary spring means comprises screw means accessible from outside of said body mean for changing compression of the secondary spring means.

19. The first stage pressure regulator according to claim 18 further comprising a plurality of outlet means disposed in said body means.

20. The first stage pressure regulator according to claim 19 further comprising at least one high pressure outlet attached to said housing and in direct fluid communication with the high pressure source of breathable gas.

21. The first stage pressure regulator according to claim 20 further comprising a plurality of high pressure outlets rotatably attached to said housing and in direct fluid communication with the high pressure source of breathable gas.

22. A SCUBA regulator system for use with a single high pressure source of breathable gas, the system comprising:

a single first stage pressure regulator having first and second pressure regulated outlets, said single first stage pressure regulator being adapted for connection to said single high pressure source of breathable gas and including means for independently delivering to said first and second pressure regulated outlets a supply of breathable gas at an intermediate pressure, said intermediate pressure being lower than the pressure of the single high pressure source of breathable gas; and two second statue pressure regulator means for receiving intermediate pressure breathable air from the first and second pressure regulated outlets and delivering breathable air to at least one mouthpiece at a pressure suitable for a SCUBA diver.

23. The system according to claim 22 further comprising means for connecting one of the two second stage pressure regulator means to the first pressure regulated outlets and another of the two second stage pressure regulator outlets to the second pressure regulated outlets.

24. The system according to claim 23 further comprising means for connecting both of the two second stage pressure regulator means to both the first and second pressure regulated outlets.

25. The SCUBA regulator system according to claim 24 wherein said single first stage pressure regulator comprises a housing and a valve seat member fixed therein, and said means for independently delivering breathable gas to said first and second pressure regulated outlet comprising a first piston having a hollow center in fluid communication with said first pressure regulated outlet and open end means for sealing said first piston against one side of the fixed valve seat member and a second piston having a hollow center in fluid communication with said second pressure regulated outlet and open end means for sealing said second piston against another side of the fixed valve seat member.

26. The SCUBA regulator system according to claim 25 wherein said single first stage regulator further comprises first spring means for biasing said first piston in order to effect a first regulated valve opening between the first piston open end means and the fixed valve seat member and second spring means for biasing said second piston in order to effect a second regulated valve opening between the second piston open end means and the fixed valve seat member.

27. The SCUBA regulator system according to claim 26 wherein said single first stage pressure regulator further comprises first secondary spring means for adjusting the amount of bias provided by the first spring means in order to relate a pressure of the supply of breathable gas available from said first pressure regulated outlet and second secondary spring means for adjusting the amount of bias provided by the second spring means in order to regulate the pressure of a supply of breathable gas available from said second pressure regulating outlet.

28. The SCUBA regulator system according to claim 27 wherein said single first stage pressure regulator further comprises first body means rotatably mounted to said housing, for supporting said first pressure regulated outlet and second body means rotatably mounted to said housing, for supporting said second pressure regulating outlet.

29. The SCUBA regulator system according to claim 28 wherein the first and second secondary spring means each comprise a screw means accruable from outside of said first and second body means respectively, for changing compression of the first and second secondary spring means.

30. The SCUBA regulator system according to claim 29 wherein said single first stage pressure regulator further comprises at least one high pressure outlet attached to said housing and in direct fluid communication with the high pressure source of breathable gas.

*31. A freeze resistant first stage pressure regulator for use with a high pressure source of breathable gas, the regulator comprising:*

*a housing;*

*means for attaching said housing to a high pressure source of breathable gas;*

*a pressure regulated outlet;*

*a valve seat;*

*a piston;*

*spring means for biasing said piston in order to effect a regulated valve opening between the piston and the valve seat and provide a pressure regulated supply of breathable gas to said pressure regulated outlet, said spring means, piston and valve seat being sealed within said housing;*

*antifreeze fluid means, sealed within said housing, for preventing icing and corrosion of the spring means and piston; and*

*pressure transfer means, disposed in a wall of said housing and in fluid communication with said antifreeze fluid means, for equalizing pressure between ambient water and said antifreeze fluid means.*

*32. The freeze resistant first stage pressure regulator according to claim 31 wherein said pressure transfer means comprises a movable piston disposed with one side thereof exposed to said antifreeze fluid means and another side exposed to said ambient water.*

*33. In a first stage SCUBA pressure regulator having a housing with a spring chamber and a spring disposed therein for providing a pressure regulated supply of air, an improvement comprising:*

*antifreeze fluid means, sealed within said spring chamber, for excluding contact of said spring with ambient water; and*

*pressure transfer means, disposed in a wall of said spring chamber and in fluid communication with said antifreeze fluid means, for equalizing pressure between the ambient water and said antifreeze liquid means.*

*34. The regulator improvement according to claim 33 wherein said pressure transfer means comprises a movable piston disposed with one side thereof exposed to said antifreeze fluid means and another side exposed to said ambient water.*

* * * * *